(12) United States Patent
Sale et al.

(10) Patent No.: US 6,706,184 B2
(45) Date of Patent: Mar. 16, 2004

(54) UNSUPPORTED MULTIZONE MICROPOROUS MEMBRANE

(75) Inventors: Richard Sale, Tolland, CT (US); Eugene Ostreicher, Bernard, ME (US)

(73) Assignee: Cuno Incorporated, Meriden, CT (US)

( * ) Notice: Subject to any disclaimer, the term of this patent is extended or adjusted under 35 U.S.C. 154(b) by 333 days.

(21) Appl. No.: 09/923,640

(22) Filed: Aug. 7, 2001

(65) Prior Publication Data

US 2002/0113006 A1 Aug. 22, 2002

Related U.S. Application Data

(60) Provisional application No. 60/223,359, filed on Aug. 7, 2000.

(51) Int. Cl.[7] .............................................. B01D 29/46
(52) U.S. Cl. ............ 210/500.27; 210/490; 210/500.41; 210/500.42; 264/41; 427/244; 427/245
(58) Field of Search ............................ 210/490, 500.27, 210/500.42, 500.41; 264/41; 427/244, 245

(56) References Cited

U.S. PATENT DOCUMENTS

| | | | |
|---|---|---|---|
| 3,876,738 A | 4/1975 | Marinaccio et al. ........... 264/41 |
| 4,001,024 A | 1/1977 | Dittman et al. ............. 96/87 R |
| 4,203,847 A | 5/1980 | Grandine, 2nd ............ 210/490 |
| 4,340,479 A | 7/1982 | Pall ............................ 210/490 |
| 4,489,671 A | * 12/1984 | Choinski ..................... 118/412 |
| 4,629,563 A | 12/1986 | Wrasidlo ................ 210/500.34 |
| 4,645,602 A | 2/1987 | Barnes, Jr. et al. ......... 210/490 |
| 4,707,265 A | 11/1987 | Barnes, Jr. et al. ......... 210/638 |
| 4,770,777 A | 9/1988 | Steadly et al. .............. 210/490 |
| 4,774,039 A | 9/1988 | Wrasidlo ...................... 264/41 |
| 4,854,262 A | 8/1989 | Chino et al. ................. 118/411 |
| 4,933,081 A | 6/1990 | Sasaki et al. ................ 210/490 |
| 5,171,445 A | 12/1992 | Zepf ........................... 210/500 |
| 5,188,734 A | 2/1993 | Zepf ........................... 210/490 |
| 5,256,357 A | 10/1993 | Hayward ..................... 264/171 |
| 5,500,167 A | 3/1996 | Degen ......................... 264/41 |
| 5,620,790 A | 4/1997 | Holzki et al. ............. 428/315.9 |
| 5,741,549 A | 4/1998 | Maier et al. ................. 427/294 |
| 5,834,107 A | 11/1998 | Wang et al. .............. 428/310.5 |
| 5,962,075 A | 10/1999 | Sartor et al. ................. 427/356 |
| 6,040,392 A | 3/2000 | Khanna et al. .............. 525/432 |
| 6,090,441 A | 7/2000 | Vining et al. ................ 427/244 |
| 6,126,826 A | * 10/2000 | Pacheco et al. ........ 210/500.42 |
| 6,146,747 A | * 11/2000 | Wang et al. .............. 428/310.5 |
| 6,264,044 B1 | * 7/2001 | Meyering et al. ........... 210/490 |
| 6,280,791 B1 | * 8/2001 | Meyering et al. ........... 427/244 |
| 6,413,070 B1 | * 7/2002 | Meyering et al. ........... 425/143 |
| 6,536,605 B2 | * 3/2003 | Rice et al. ................... 210/490 |

FOREIGN PATENT DOCUMENTS

| | | |
|---|---|---|
| WO | WO 93/22034 | 11/1993 |
| WO | WO 99/47246 | 9/1999 |
| WO | WO02/121868 A1 * | 2/2002 |

OTHER PUBLICATIONS

Kister, Stephan F., liquid Film Coating, First Edition 1997.*
Provisional patent application Ser. No. 60/223,359 filed Aug. 7, 2000.

* cited by examiner

*Primary Examiner*—Ana Fortuna
(74) *Attorney, Agent, or Firm*—R. Thomas Payne

(57) ABSTRACT

An at least two zone, unsupported, continuous microporous membrane is disclosed. The at least two zone, unsupported, continuous microporous membrane may include at least two different membrane pore size zones or the pore sizes may have about the same pore size. Apparatus and processes for fabricating at least a two zone unsupported, continuous, microporous membrane are also disclosed. One representative process disclosed for forming a continuous, unsupported, multizone phase inversion microporous membrane having at least two zones comprises of the acts of: operatively positioning at least one dope applying apparatus, having at least two polymer dope feed slots, relative to a continuous moving coating surface; applying polymer dopes from each of the dope feed slots onto the continuously moving coating surface so as to create a multiple layer polymer dope coating on the coating surface; subjecting the multiple dope zone layer to contact with a phase inversion producing environment so as to form a wet multizone phase inversion microporous membrane; and then washing and drying the membrane. Other representative apparatuses and processes are also disclosed.

75 Claims, 14 Drawing Sheets

Figure 4. 0228sd67.5

Figure 5. Cross-section of 0410S67.5

Figure 6. Close-up of 0410S67.5

Figure 10. Cross section of 0508lam

Figure11. Close up of Figure 10

Figure 13. Cross-section of membrane # 0103

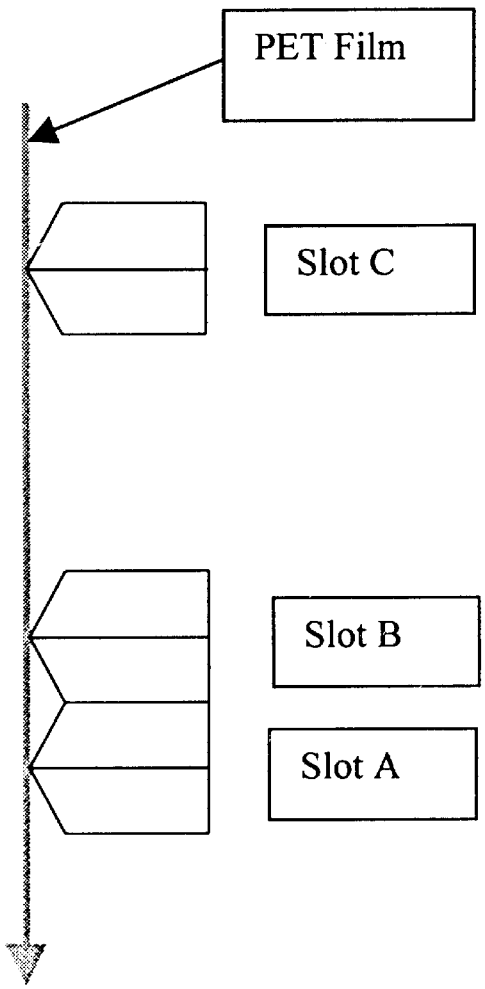
Figure 15. Order of dope application: slot C, B, A

UNSUPPORTED MULTIZONE MICROPOROUS MEMBRANE

RELATED APPLICATIONS

This application is a continuation-in-part of commonly owned U.S. Provisional patent application Ser. No. 60/223,359, filed Aug. 7, 2000, of Sale et al., entitled "Unsupported Multizone Microporous Membrane," the disclosure of which is herein incorporated by reference to the extent not inconsistent with the present disclosure.

BACKGROUND OF DISCLOSURE

The present disclosure relates to continuous, unsupported, microporous membranes having two or more distinct, but controlled pore sizes and to processes of making and using same, more particularly to unsupported microporous membranes made from a first dope and at least one additional dope being applied directly to one another prior to the at least two dopes being quenched and to apparatus for manufacturing and processes for making such membrane.

Microporous phase inversion membranes are well known in the art. Microporous phase inversion membranes are porous solids which contain microporous interconnecting passages that extend from one surface to the other. These passages provide tortuous tunnels or paths through which the liquid which is being filtered must pass. The particles contained in the liquid passing through a microporous phase inversion membrane become trapped on or in the membrane structure effecting filtration. The particles in the liquid that are larger than the pores are either prevented from entering the membrane or are trapped within the membrane pores and some particles that are smaller than the pores are also trapped or absorbed into the membrane pore structure within the pore tortuous path. The liquid and some particles smaller than the pores of the membrane pass through. Microporous phase inversion membranes have the ability to retain particles in the size range of from about 0.01 or smaller to about 10.0 microns or larger.

Many important micron and submicron size particles can be separated using microporous membranes. For example, red blood cells are about eight (8) microns in diameter, platelets are about two (2) microns in diameter and bacteria and yeast are about 0.5 microns or smaller in diameter. It is possible to remove bacteria from water by passing the water through a microporous membrane having a pore size smaller than the bacteria. Similarly, a microporous membrane can remove invisible suspended particles from water used in the manufacture of integrated circuits in the electronics industry.

Microporous membranes are characterized by bubble point tests, which involve measuring the pressure to force either the first air bubble out of a fully wetted phase inversion membrane (the initial Bubble Point, or "IBP"), and the higher pressure which forces air out of the majority of pores all over the phase inversion membrane (foam-all-over-point or "FAOP"). The procedures for conducting initial bubble point and FAOP tests are discussed in U.S. Pat. No. 4,645,602 issued Feb. 24, 1987, the disclosure of which is herein incorporated by reference to the extent not inconsistent with the present disclosure. The procedure for the initial bubble point test and the more common Mean Flow Pore tests are explained in detail, for example, in ASTM F316-70 and ANS/ASTM F316-70 (Reapproved 1976) which are incorporated herein by reference to the extent not inconsistent with the present disclosure. The bubble point values for microporous phase inversion membranes are generally in the range of about two (2) to about one hundred (100) psig, depending on the pore size and the wetting fluid.

U.S. Pat. No. 3,876,738, the disclosure of which is herein incorporated by reference to the extent not inconsistent with the present disclosure, describes a process for preparing microporous membranes by quenching a solution of a film-forming polymer in a non-solvent system for the polymer. U.S. Pat. No. 4,340,479, the disclosure of which is herein incorporated by reference to the extent not inconsistent with the present disclosure, generally describes the preparation of skinless microporous polyamide membranes by casting a polyamide resin solution onto a substrate and quenching the resulting thin film of polyamide.

Multizone membrane offers much greater life and flow than conventional membranes while still maintaining adequate control of the thickness and pore size of each zone to ensure reliable retention. A three-zoned membrane may contain a tight or relatively small pore size zone sandwiched between two open or relatively large pore size zones. The open or relatively large pore size zones would not restrict flow but would serve to protect the tight or relatively small pore size zone from abrasion or damage, allowing it to be much thinner and still maintain integrity. Materials such as polyvinylidene fluoride (PVDF) or polyether sulfone (PES) do not require reinforcement because of their inherent strength. Scrimless membranes however, require a coating surface, such as, for example, a belt or drum to support them when cast. The die or dope applying apparatus required to cast multiple microporous membrane zones must be practically located on the same side of the coating surface and designed to control the membrane properties. Potential design constraints are discussed below. The membrane pore size of each zone can be controlled through polymer content, solvent and nonsolvent amount and temperature history of the dissolved dope. Potential constraints on these variables will be discussed below.

There is an extensive body of knowledge concerning multiple ply films and slot die technology. This prior art deals with the extrusion of films that are essentially impermeable. This prior art also discusses manufacture of both photographic film and films used in the packaging industry (e.g. food packaging). Some examples of patents, each of which are herein incorporated by reference to the extent not inconsistent with the present disclosure, disclosing multizone films are listed in the table below:

| Patent | Issued | Inventor(s) | Title |
| --- | --- | --- | --- |
| U.S. Pat. No. 6040392 | 2000 | Khanna et. al. | Nylon 6 or 66 Based Compositions and Films Formed Therefrom Having Reduced Curl. |
| U.S. Pat. No. 5962075 | 1999 | Luigi et. al. | Method of Multizone Die Coating Using Viscosity Adjustment |
| U.S. Pat. No. 5741549 | 1998 | Maier et. al. | Slide Die Coating Method and Apparatus with Improved Die Tip |
| U.S. Pat. No. 5256357 | 1993 | Hayward | Apparatus and Method for Cocasting Film Zones |
| U.S. Pat. No. 4854262 | 1989 | Chino et. al. | Coating Apparatus |
| U.S. Pat. No. 4001024 | 1977 | Dittman et. al. | Method of Multizone Coating |

Other art involves the manufacture of microporous membranes by other techniques. Grandine provides the first practical disclosure of the manufacture of PVDF membrane. The Grandine patent (U.S. Pat. No. 4,203,847) discloses, although does not claim, that thermal manipulation of the dope will lead to a change in pore size of the resulting membrane. Surprisingly, given that nylon is a very different polymer that is dissolved in ionic organic acids rather than an organic ketone, it experiences a similar phenomenon. Grandine did not suggest a mechanism for this phenomenon to indicate that it might be general for polymers used to make membranes.

Subsequent patents relating to PVDF disclose methods for making asymmetric PVDF membrane. The Wang patent (U.S. Pat. No. 5,834,107) discloses a variety of methods to manufacture asymmetric membrane. Other patents that are related to asymmetric structure and which are cited in the Wang patent are Costar (WO 93/22034), Sasaki (U.S. Pat. No. 4,933,081), Wrasidlo (U.S. Pat. No. 4,629,563 & U.S. Pat. No. 4,774,039), and Zepf (U.S. Pat. Nos. 5,188,734 & 5,171,445).

Other prior art is the use of thermal manipulation to create distinct zones of controlled pore size with nylon membrane by Meyering et. al. (application WO99/47246, the disclosure of which is incorporated herein by reference to the extent not inconsistent with the present disclosure) applying two layers of dope against opposite sides of a support scrim after the scrim was filled with a first dope. In some applications, especially pleated cartridge filters, Nylon is an intrinsically weak material which requires the use of a scrim to function in particular applications effectively, but unreinforced or unsupported nylon is used in other applications. The presence of the reinforcing or supporting scrim requires multiple dies, one to provide dope within and to fill the scrim for the middle membrane zone and the other two dies to apply the dope for the outer two membrane zones.

Additional prior art is Degen (U.S. Pat. No. 5,500,167) which also claims a supported membrane with a porous nonwoven fibrous support wherein the two zones of the membrane are divided into zones of different pore sizes. In that case, a second dope layer to form a second zone is applied to a first dope layer in a secondary, sequential operation with the scrim partially outboard of the two finished zones.

Steadly U.S. Pat. No. 4,770,777 deals with skinned multi-layer membranes. but is not made from at least two dopes.

Another approach to joining two different membrane zones together is wet laminating wherein membranes that have been cast and quenched but not dried are joined under mild pressure and then dried together. Wet lamination is prone to delamination, which can be a particular concern if the membrane is back-flushed. As a practical matter, laminated multizone membranes tend to be thicker than single zone membranes since each zone is an independently, individually prepared membrane which included being quenched prior to being laminated together to form the multizone membranes. These prior art membranes are clearly relatively thick, as each zone of the laminated multizone membrane must be individually sufficiently thick in order to survive the membrane manufacturing process and then be joined with at least one other individual sufficiently thick membrane, individually and separately prepared, to form a multizone laminated membrane.

Slot die technology prior art on generally does not deal with the manufacture of microporous membranes nor it's the requirements for the manufacture of microporous membranes with the exception of the Meyering et al. disclosure mentioned above.

Asymmetric membrane prior art on s does not disclose, suggest or teach independent control the properties of each zone (such as thickness or pore size) nor are the zones reliably discrete.

Finally, multizone nylon membrane prior art has conventionally required a reinforcing or supporting scrim (porous nonwoven fibrous support) in order to function in a commercial environment.

Thus, there is a need for unsupported or scrimless, multizone polymeric microfiltration membrane having at least two independent and distinct pore size performance zones progressing through the thickness of the membrane, each zone being continuously joined throughout the membrane structure. Such a multizone membrane should eliminate the reinforcing or supporting scrim while realizing the advantages of multizone filtration control. Such a scrimless multizone membrane should have at least two separate zones that are continuously joined by the molecular entanglement that occurs in the liquid state of the dope layer after the dope layer for one membrane zone is coated onto the dope layer for another membrane zone prior to phase inversion. Such a multizone scrimless membrane should be produced by a highly robust, single unit operation, with on-line pore size and zone thickness attribute control. Such a multizone scrimless membrane should be as thin as single zone membranes and thinner than prior art laminated multizone membranes. Such a multizone scrimless membrane should be relatively inexpensively and easily manufactured.

SUMMARY OF THE DISCLOSURE

The present disclosure is directed to multizone membrane without a reinforcing or supporting scrim (nonwoven porous support), apparatuses and processes for the manufacture thereof. The scrimless or unsupported membrane may be substantially simultaneously formed into multiple (two or more) discrete zones, each with, presently preferably, a different but controlled pore size. However, it is envisioned that a multizone membrane comprising at least two adjacent zones having the same pore size might be advantageous in certain applications. Layers of dope that form the zones are applied directly to one another prior to the membrane quench such that the discrete pore structures are maintained within the separate zones but the separate zones are integrally joined.

The concept taught could be applied to nylon, PVDF, PES, PP or any membrane component wherein pore size can be controlled though dope preparation, which may include formulation of constituents or thermal manipulation prior to casting.

The present disclosure claims the process of substantially, simultaneously coating multiple fluid layers consisting of different polymer/solvent or polymer/solvent/nonsolvent solutions on to a moving self-releasing substrate and then subjecting such multiple fluid layers to a phase inversion process in, for example, a nonsolvent or solvent/nonsolvent liquid bath in such a manner as to produce an unsupported, multizone microporous membrane having multiple pore size layers. The moving casting or coating surface material is selected so the polymer solutions used for the different dope layers that form the different zones may vary from each other in terms of composition, thermal history or end-group functionality. The generic concept for the substantially, simultaneously coating of multiple fluid layers is described below.

One aspect of the present disclosure includes a process for forming a continuous, unsupported, multizone phase inversion microporous membrane having at least two zones, comprising of the acts of: operatively positioning at least one dope applying apparatus having at least two polymer dope feed slots relative to a continuously moving coating surface; cooperatively applying polymer dopes from each of the dope feed slots onto the continuously moving coating surface so as to create a multilayer polymer dope coating on the coating surface; and subjecting the multiple dope layer coating to contact with a phase inversion producing environment so as to form a wet multizone phase inversion microporous membrane.

Another aspect of the present disclosure includes a process for forming a continuous, unsupported, multizone phase inversion microporous membrane having at least two zones, comprising of the acts of: operatively positioning at least two dope applying apparatus, each having at least one polymer dope feed slot, relative to a coating surface; sequentially applying polymer dopes from each of the dope applying apparatus onto the coating surface so as to create a multilayer polymer dope coating on the coating a surface; and subjecting the sequentially applied polymer dopes to contact with a phase inversion producing environment so as to form a wet multizone phase inversion microporous membrane.

Still another aspect of the present disclosure includes a multizone, unsupported, membrane comprising: a first zone having a first pore size; and at least a second zone having a second pore size, the first and second zones being operatively connected such that the multizone membrane is continuous and does not include any support material.

BRIEF DESCRIPTION OF THE DRAWINGS

FIG. 15 is a schematic view of a representative apparatus useful to produce membrane according to the present disclosure.

DETAILED DESCRIPTION OF THE DISCLOSURE

Figure 1:
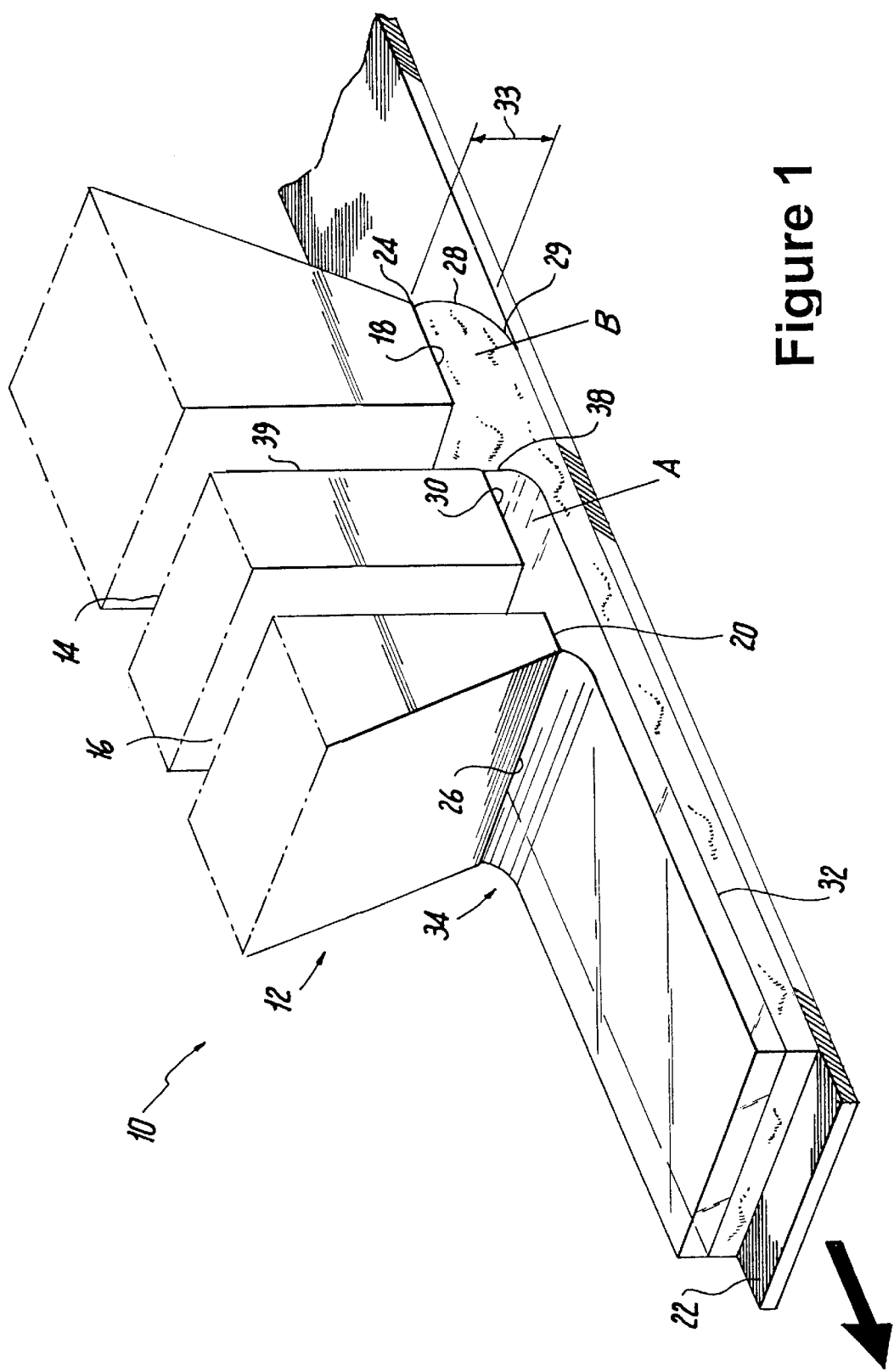
FIG. 1 is a perspective view of a representative die useful to produce membrane according to the present disclosure.

The following define specific terms, as they are understood to be used in the present disclosure.

By the term "polymer dope (s)" or "dope (s)," we mean a polymer dissolved in a solvent such that it will form a pore structure when subjected to a phase inversion process.

By the term "phase inversion process," we mean a process of exposing a polymer dope to a controlled environment to induce liquid-liquid demixing so as to form a pore structure. Phase inversion is a necessary step in the formation of microporous membrane. The process is induced by a number of mechanisms well known to those versed in the art. Examples of phase inversion include but are not limited to:

Contacting the polymer dope coating to a solution of solvent and nonsolvent containing a higher percentage of nonsolvent than the dope solution.

Thermally induced phase inversion.

Exposing membrane to a vapor interface and evaporating the solvent from the dope coating.

By the term "coating surface," we mean a very smooth flat essentially impermeable surface that the dope will wet but from which it will readily release after the phase inversion process. Suitable coating surfaces can be, such as, for example, a belt or a drum, disposable or reusable, and made from materials such as PET film or stainless steel. We would anticipate that a flexible coating surface would require additional support (for example rollers underneath a smooth flexible belt) to properly support the membrane coating.

By the term "unsupported multizone membrane," we mean membrane without a scrim in which each dope layer is substantially simultaneously applied to the coating surface by a dope applying apparatus. The resulting layers are subjected to a phase inversion process, washed and then dried. Drying mechanisms are already well established. Various configurations of the resulting two membrane zones are defined below. Each membrane zone has its own consistent pore size (each membrane zone is symmetric). References to wet multizone membrane are characterizing the intermediate product, after phase inversion, but just prior to the washing and drying step.

By the term "cooperatively applying polymer dopes," we mean that the multiple coating dope layers form cooperatively from slots in such close proximity that there is no air gap between the two liquid interface layers as they are applied in hydrodynamic equilibrium to the coating surface. Dope layers in hydrodynamic equilibrium form a semi-enclosed environment (with the exception of the edges) and are formed in a controlled equilibrium in terms of thickness relative to one another. Discussion of multiple slot dies are presented in a Master Thesis written by Shawn David Taylor titled Two-Layer Slot Coating: Study Of Die Geometry And Interfacial Region at McMaster University dated July 1997, the disclosure of which is hereby incorporated by reference to the extent not inconsistent with the present disclosure.

By the term "dope applying apparatus," we mean a device that operatively transfers polymer dope to a coating surface such that the thickness of the transferred dope is substantially controlled, examples of such devices include, but are not limited to, doctor blades, slot dies and other structures which prove capable of performing the function of the representative example doctor blades and slot dies.

By the term "substantially, simultaneously coating multiple fluid layers," we mean that the dopes are applied to the coating surface with sufficient restrictions in time and space so that no significant pore formation has begun, as evidenced by the opacity of the cast layer, as would be expected as the result of a quench or phase inversion process prior to the casting layers being joined.

As shown in FIG. 1, a representative system 10 for producing an at least a two-zone, multizone unsupported microporous membrane is illustrated. As shown, the representative system comprises a representative die (schematically shown) having at least two feed slots 14, 16. The die has an upstream die lip 18 and a downstream die lip 20. When dope is being applied to a moving coating surface or web 22, and dopes A and B are exiting their respective feed slots 16, 14, there are two static contact lines 24, 26, as illustrated. As shown, when the coating surfaces or web 22 is moving in the direction as shown for web direction, dope, which is being fed from a location by any one of a plurality of known means, is deposited on the coating surface and forms an upstream meniscus 28 and a down stream meniscus 34 at a dynamic contact line 29. As the coating surface 22 moves, the dope B that is deposited thereon is also moved in the direction of the web, and additional dope A from the second feed slot 16, with the feed slots being divided by a center die lip 30 is then applied onto the top of the first dope B for a distance, shown as the coating gap 32, between the downstream die lip 20 and the dynamic contact line 29. The application of at least this second dope B from at least the second feed slot 16 then interacts, as explained in U.S. Pat. No. 6,090,441 of Vining et al., the disclosure of which is herein incorporated by reference to the extent not inconsistent with the present disclosure, with the first dope A from feed slot 14 at an interfacial region 32.

At this point, the coating surface 22 moves in one direction and carries the dopes A, B from the downstream meniscus 34 to a quenching mechanism (not shown), as is known in the art. As schematically illustrated, there is a separation line 38 between the at least two dopes A, B formed proximate the down stream wall 39 of the first dope feed slot 14. Further, in the interfacial region 32, it has been observed that the interfacial dope region (region 32) illustrates a clear demarcation in pore size but the polymer structure is continuous. As shown, the coating gap 32 is adjustable and will be controlled, as is known in the art.

The resulting pore size of the representative membrane made, as shown in FIG. 1, from the dope (whether each feed stream in the die comes from a single mother dope subsequently manipulated or from more than one mother dope) may be manipulated by polymer concentration, amount of solvent and non-solvent, and temperature history of the dope prior to formation. However, polymer concentration will also impact viscosity of the dope. It is expected that viscosity will need to be controlled for the proper functioning of the slot die so that it will be difficult or inconvenient to use polymer concentration as a means to control pore size. That leaves solvent to non-solvent ratio (once polymer concentration is fixed so is solvent amount) and thermal history to control the membrane pore size. Membrane pore size may also be affected by layer thickness (controlled by dope metering) and coating surface speed. It is also anticipated that the distance from the die slots to the receiving coating surface must be controlled. Too small a distance will limit the membrane thickness and too great a distance will break the membrane meniscus and lead to defects in the surface and poor control.

The polymer dopes must subsequently be subjected to phase inversion by means already well established. The design necessitates that the membrane must transverse an air gap prior to being quenched although, if necessary, that air gap may be environmentally controlled with humidity or even a gas blanket. Some care may be required in the phase inversion process so that the membrane does not form a skin or have the freshly cast layers separate prior to stabilization in quench. In practice, the layers did not separate. The membrane may be dried in a controlled manner by means already well established.

The above disclosure is relevant for a number of polymers that will yield membrane. Polymers such as nylon, PVDF, PES, or polypropylene may function. It is not mandatory that the two (or more) dope layers be subject to thermal manipulation if dope formulation can alter effective pore size.

While it was initially anticipated that a single die with multiple slots would function more effectively than separate dies, actual experience has proven to the contrary and two or more single slot dies separated by a small distance have also proven to be operable. As shown by the examples, it has proven possible to use a two slot die in combination with an at least one slot die to make a three zone membrane and thus, four or more zone membranes appear possible as well. Prior to the conduct of the examples below, it was believed that a single die would maintain a semi-enclosed environment (with the exception of the edges) for the multiple cast dope layers, which are formed, but experience has proved this theory to be incorrect according to the examples below. Applying a second cast dope layer to form one zone of the membrane in a separate step from casting the first dope layer has not proven to lead to significant deformation of the first zone, as shown by the examples below. In addition, separating the casting of the dope layers in space from the formation of the membrane has also not proven to lead to significant solvent evaporation of the first layer and unnecessarily delay the time required to stabilize the membrane formation in a quench.

The multiple slot die would be mounted preferably such that the polymer is extruded down but conceivably other angles could be employed and it was determined that vertical orientation of the coating surface operatively functioned to produce unsupported multizone membrane.

Figures 2, 3:
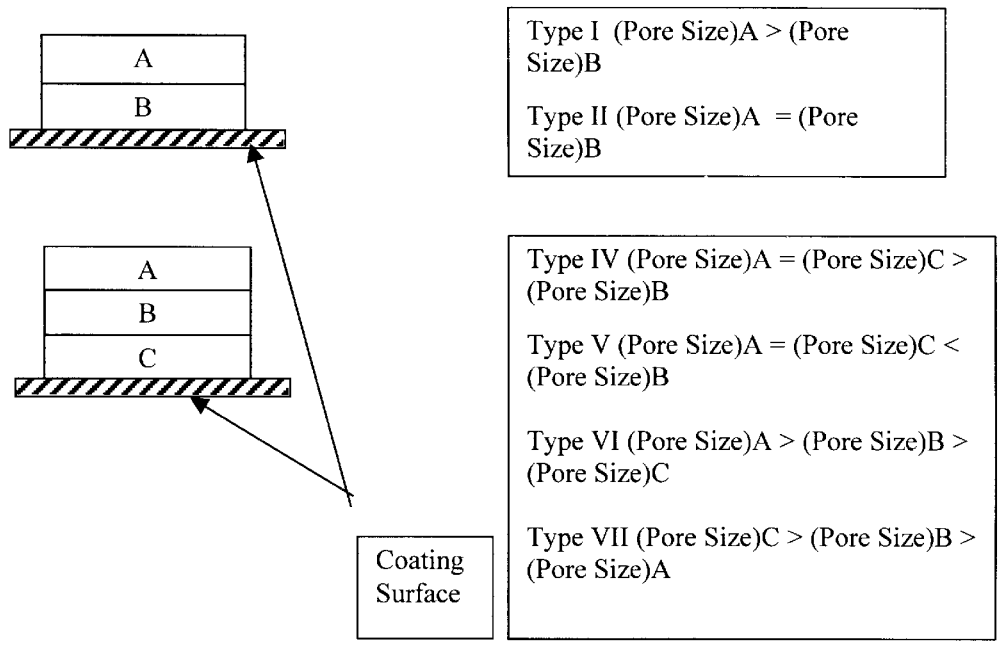
FIG. 2 is a schematic plan view of a representative membrane produced according to the present disclosure.
FIG. 3 is a schematic plan view of another representative membrane produced according to the present disclosure.

FIGS. 2 and 3 illustrate various possible embodiments of the unsupported multizone membrane according to the teachings of the present disclosure. As shown, Type I illustrates an unsupported multizone membrane wherein the pore sizes are different such that the larger pore size membrane would serve as an upstream protection zone for the smaller pore size membrane extending the life of the filter media.

As shown, Type II illustrates a simpler case of Type I wherein the two pore sizes are the about the same. This approach may be preferred over a single cast membrane since membrane composed of multiple coatings reduces the risk of a single defect in the single coating of a single cast membrane compromising the overall retention of the membrane.

As shown, Type III illustrates the reverse of Type I in the event that the reverse coating sequence confers some end-use advantage for either the upstream or the downstream side of the finished membrane.

As shown, Type IV illustrates an unsupported multizone membrane wherein two outer larger pore-size zones sandwich a middle zone having a relatively smaller pore size. Such constructions are advantageous because the outside zones protect the inner qualification zone from damage during filter cartridge fabrication.

As shown, Type V illustrates an unsupported multizone membrane wherein the two outer smaller pore size membrane zones sandwich a larger pore size inner or middle zone. Such a construction may provide the retention benefit of a small pore size membrane but yield a higher permeation rate than a conventional design since the inner membrane zone has a larger pore size and therefore exhibits a lower pressure drop.

As shown, Type VI illustrates an unsupported multizone membrane wherein three zones are stacked with progressively decreasing pore size.

As shown, Type VII illustrates the situation wherein the largest pore size zone is initially positioned against the coating surface, if such location should prove advantageous.

As is apparent to anyone skilled in the art, additional dope layers to form additional membrane zones can be added up to the practical limit of membrane fabrication without substantially deviating from the spirit of the present disclosure.

In addition, we envision membranes wherein the membrane zones could be varied by properties other than pore size, such as by chemistry or molecular weight. In some cases, lower molecular weight polymers offer a high degree of functionality but do not offer strength.

A type VIII configuration could be made by producing membrane zones by combining dopes from polymers of differing molecular weight. Logically, this concept could be applied to three or more membrane zones.

A type IX membrane could be made if the dope layers varied in polymer chemistry. For example, in PVDF membrane, the relative amount of polyvinyl pyrrolidone can be varied to adjust properties. Logically, this concept could be applied membrane having three or more zones.

As is apparent to anyone versed in the art, additional membrane zones can be added up to the practical limit of membrane fabrication without substantially deviating from the spirit of this disclosure.

The following represents actual experiments conducted to verify the concept described above.

PVDF Experiments

The following experiments were conducted to confirm the viability of the producing multizone, unsupported microporous membrane using PVDF.

PVDF Ingredients

The following ingredients were employed in the experiments that follow.

| Chemical | Trade name | Manufacturer | Mfg. Location |
| --- | --- | --- | --- |
| PVDF | Kynar 761 | Elf Atochem NA | Philadelphia, PA |
| IPA | 2-propanol ACS reagent | Aldrich | Milwaukee, WI |
| NMP | 1-methyl 2 pyrrolidinone ACS reagent | Aldrich | Milwaukee, WI |

PVDF Methods

A mixture of 15%, PVDF (Kynar 761), 15% IPA (2-propanol ACS reagent)and 70% NMP (1-methyl 2 pyrrolidinone ACS reagent), with a total weight of about 200 grams, were blended and sealed into a jar with a magnetic stir bar, all of which was immersed into a jacketed beaker with the water in the jacket circulated at a predetermined temperature. A magnetic stirrer provided the mixing. The resulting dope was heated to a temperature between about 10–15° C. below the target temperature ($T_{max}$), to bring the constituents into solution.

The dope was then heated to the target temperature ($T_{max}$) via the circulating water in the jacket and held at that temperature for a minimum of about one hour.

To make single zone membrane, the dope was poured into a doctor blade with a gap setting of about 0.016 inches and pulled across a substrate, in this case, a piece of glass, at about 6 feet per minute to cast the membrane film. If a two zone membrane was made, a second dope was placed into a second doctor blade with a gap of about 0.032 inches. The second doctor blade was made wider than the first doctor was blade and the back plate was raised so that the sides and back of the second doctor lade would not drag through the layer of the first cast dope and disrupt the first cast dope surface. There was approximately a 30 second delay between the casting of the first layer and the second layer of dope.

The glass plate with the cast membrane, one or two layers, was then submerged into a shallow tray containing a quench fluid of about 25% deionized water and about 75% isopropyl alcohol. The cast material was allowed to quench for about three minutes before being removed from the quench solution and transferred to rinse. The rinse consisted of a shallow tray of deionized water with some overflow to help flush out impurities. The membrane was then lifted from the glass plate and allowed to rinse for a minimum of about 30 minutes to ensure complete removal of solvents. The quenched membrane was then restrained on a hemidrum and dried in a convection oven at about 70° C. for about thirty (30) to about forty (40) minutes.

TABLE 1

Experiments with PVDF Membrane

| ID | Membrane Construction | Avg. IPB psi | Avg. FAOP psi | Avg. Flow @ 5 psid ml/min/cm$^2$ | Thickness mils |
| --- | --- | --- | --- | --- | --- |
| 0410s67.5 | Two zones | 12 | 16.5 | 7.1 | 8.2 |
| 0410s62.5 | Two zones | 21 | 26 | 3.9 | 7.7 |
| 0228sdr67.5 | Two zones | 36.5 | 53 | 0.8 | 9.4 |
| 0508lam55 | 2 zone laminate | 43 | 58 | 1.1 | 6.3 |
| 0123-62.5A-22 | single zone | 8.25 | 10.5 | 19.3 | 6.2 |
| 0223E | single zone | 22.8 | 38 | 1.1 | 7.5 |
| 0119-60A-24 | single zone | 33.3 | 38.5 | 1.5 | 6.2 |

Table 1 summarizes some of the examples of membranes prepared with sequential applications of PVDF membrane as described in the above procedure. An example of a laminated membrane is also provided wherein two separate and distinct membranes were separately cast, quenched and rinsed prior to being pressed and dried together, in accordance with one prior art process, to form the laminated sample. The controls for this example consisted of a single zone membrane. It should be noted that only a representative number of examples are presented for brevity purposes, as a number of other example experiments were actually conducted.

At a given bubble point, the expected result was that a two zone membrane would yield better flow than a single zone membrane. This expected result was based on the theory that the thickness of the relatively small pore size zone in a two zone membrane would be less than the total thickness of a single zone membrane (the value in Table 1 is total thickness) and since flow is a function of thickness, flow was expected to improve.

As will become apparent, Scanning Electron Microscope (SEM) and forward flow bubble point analysis make it clear that a two zone membrane construction was achieved. However, the anticipated improved flow for a two zone membrane relative to the prior art was difficult to compare due to variations in bubble point of the samples.

Figure 4:
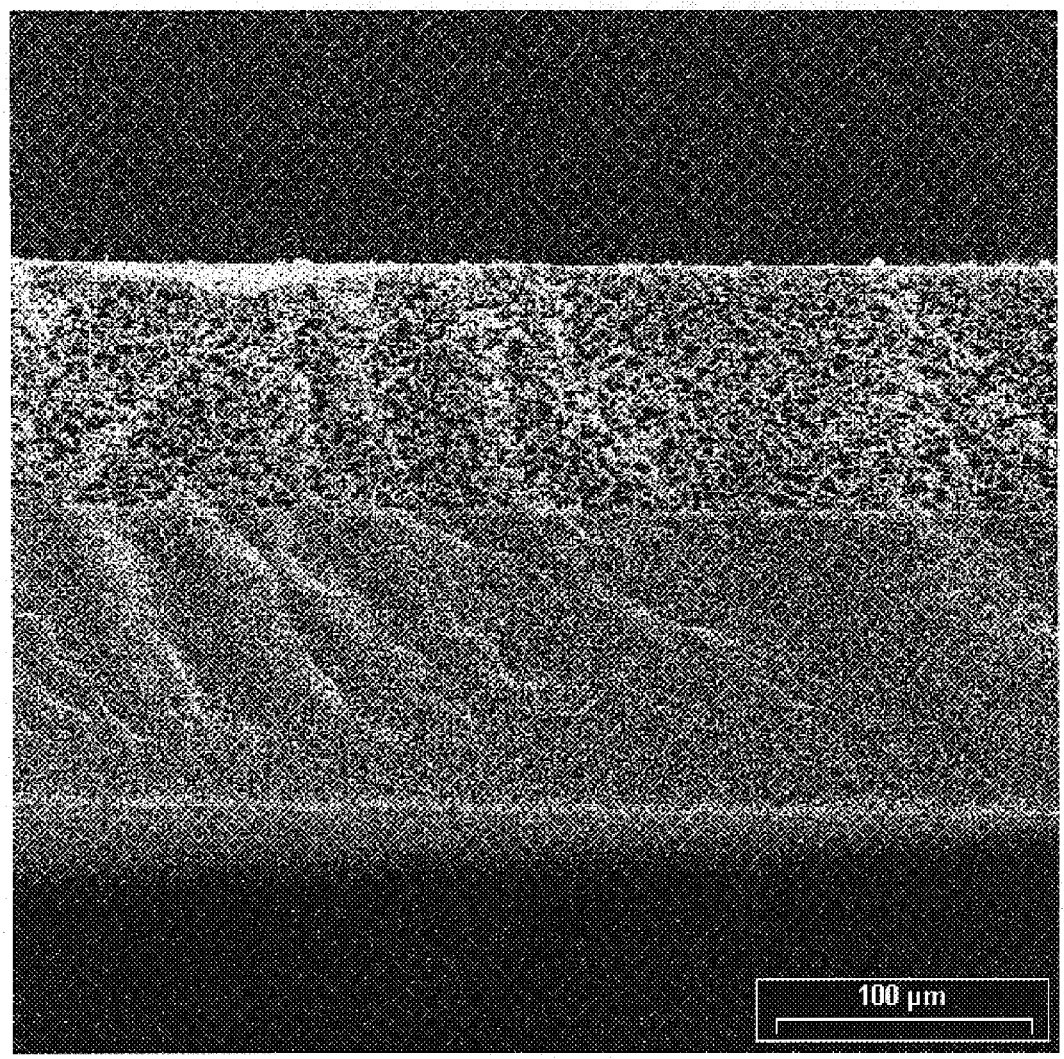
FIG. 4 illustrates a SEM cross section of an unsupported multizone PVDF sample 0228sd67.5 membrane cast with a doctor blade.

FIG. 4 illustrates a cross section of an unsupported multizone PVDF membrane cast with a dope applying apparatus, such as, for example, a doctor blade as described in the above procedure. The $T_{max}$ of the dope used to form the relatively large pore size zone was 67.5 C. and the bubble point was approximately 4–5 psi in 60/40 IPA/water. The dope used to form the relatively small pore size zone had a $T_{max}$ of about 55 C. and a forward flow bubble point of about 40 psi. The initial bubble point of about 36.5 psi, as shown in Table 1, was a little lower.

It is anticipated that a two zone membrane or more multizone membrane will offer better filtration life than a single zone membrane of the same bubble point and thickness. As can be readily seen, two distinct zones having distinct pore sizes are clearly visible. Further, FIG. 4 illustrates a distinct differentiation between one pore size zone and the other pore size zone, while the membrane itself is continuous in that it has a unitary structure. Thus, FIG. 4 clearly illustrates that a multizone unsupported microporous membrane having at least two different pore sizes can be produced, in accordance with the present disclosure.

Figure 5:
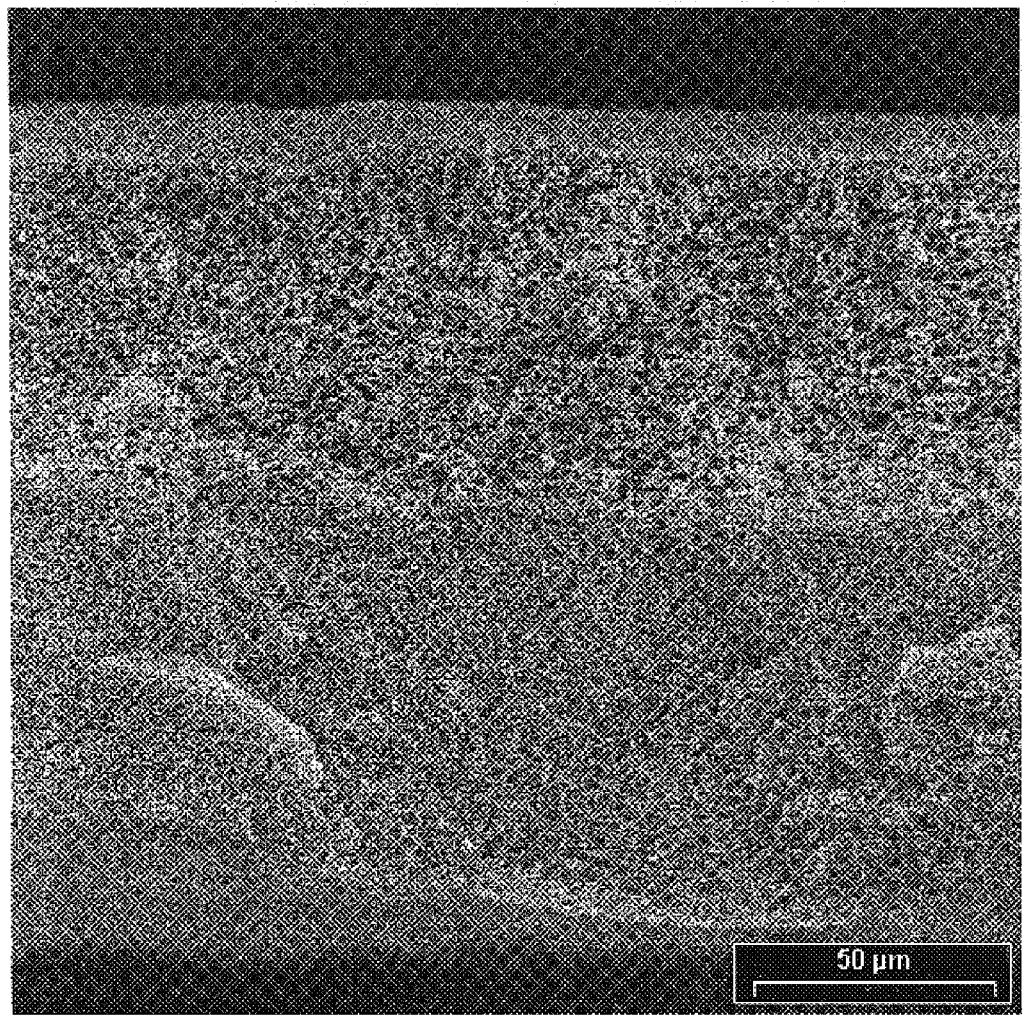
FIG. 5 illustrates a SEM cross section of an unsupported multizone PVDF membrane sample 0410S67.5.
Figure 6:
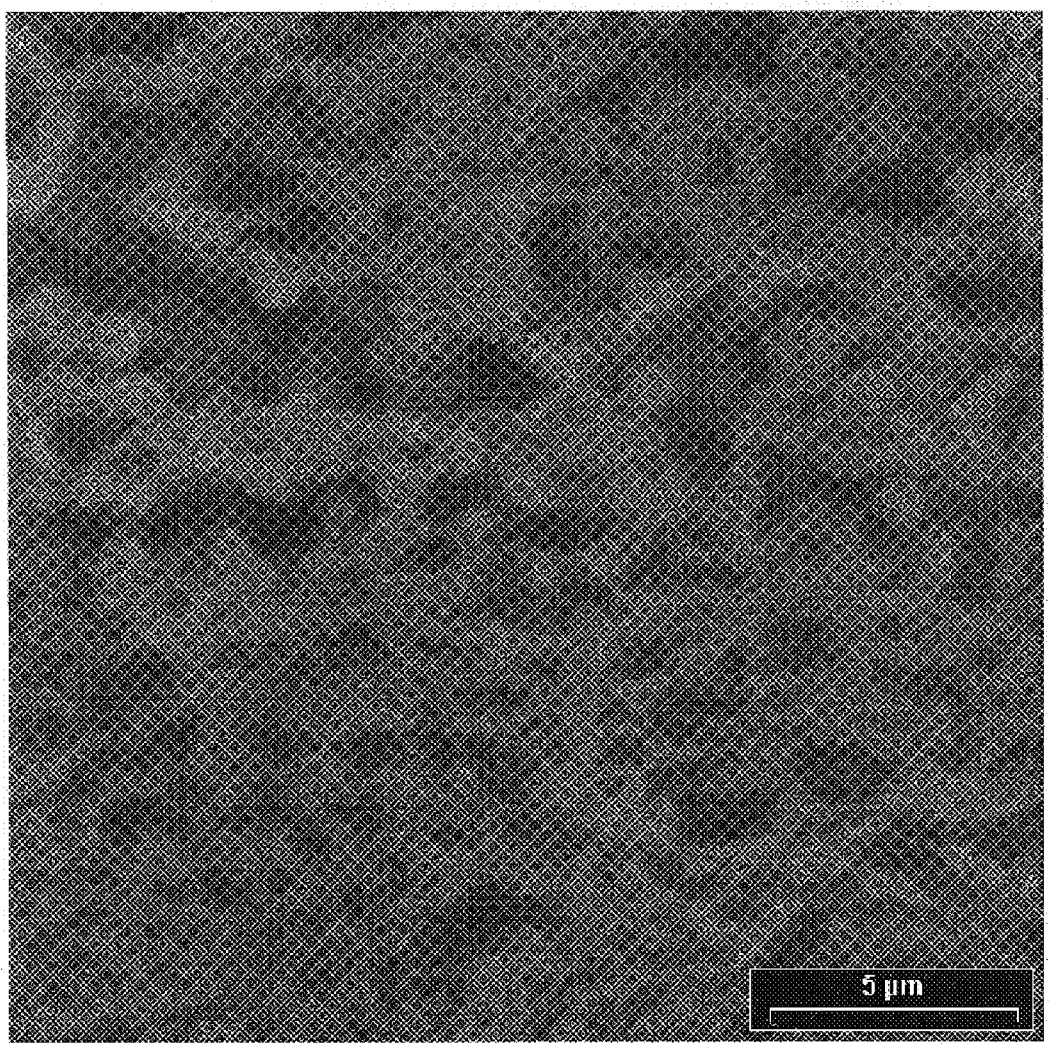
FIG. 6 illustrates a close-up of the interface of the two zones of FIG. 5.

FIG. 5 illustrates another cross section of an unsupported multizone PVDF membrane wherein the $T_{max}$ of the dope used to produce the open or relatively large pore size zone was about 67.5° C. and the $T_{max}$ of the dope used to produce the tight or relatively small pore size zone was about 62.5° C. FIG. 6 illustrates a close-up of the interface of the two zones to show that the transition between the zones appears to be seamless, i.e., continuous. Although the pore size changes from one zone to the next, the membrane formed has a continuous interface between the two adjacent zones.

Figure 7:
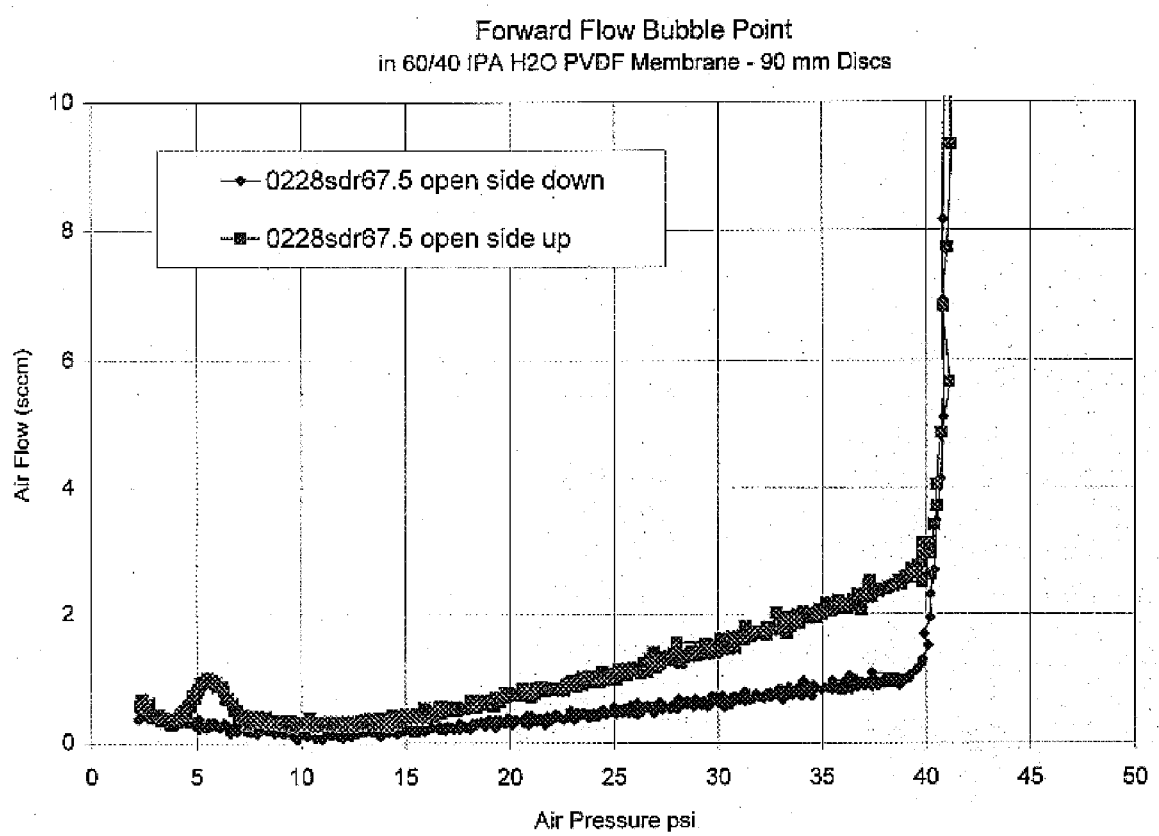
FIG. 7 illustrates two forward flow bubble point curves for sample 0228sdr67.5 of Table 1.

FIG. 7 illustrates two forward flow bubble point curves for sample 0228sdr67.5. The data for FIG. 7 was generated by testing the sample with the open or relatively large pore size side up, and then flipping the sample over and testing the sample again with the tight or relatively small pore size side up.

With the sample membrane's open or relatively large pore size side up, the rising air pressure will first clear the pores of the open or relatively large pore size zone. The fluid then clears the open or relatively large pore size zone but the tight or relatively small pore size zone underneath retains the fluid until an adequate pressure is reached to clear those pores. The mass flow meter records this first event either with a temporary increase in airflow (shown as a peak) or a permanent increase in airflow that continues at a low level below the level of bulk flow. This latter phenomenon appears to be at least partially due to the increase in diffusional flow because the gas must only diffuse through half the membrane or one zone.

While it was clear from the SEM photograph of FIGS. 5 and 6 showing sample 0228sdr67.5, the forward flow bubble point graph of FIG. 7 illustrates the results of a forward flow bubble point test using a much larger sample of the membrane as contained in a 90 millimeter disc. These results clearly indicated that the membrane produced and tested was a multizone membrane, with the multizone structure being achieved over the entire 90 millimeter disc surface area, thus, confirming that the membrane produced was, in fact, a multizone membrane and thereby confirming that the technique of production used in the examples were both practical and effective.

Figure 8:
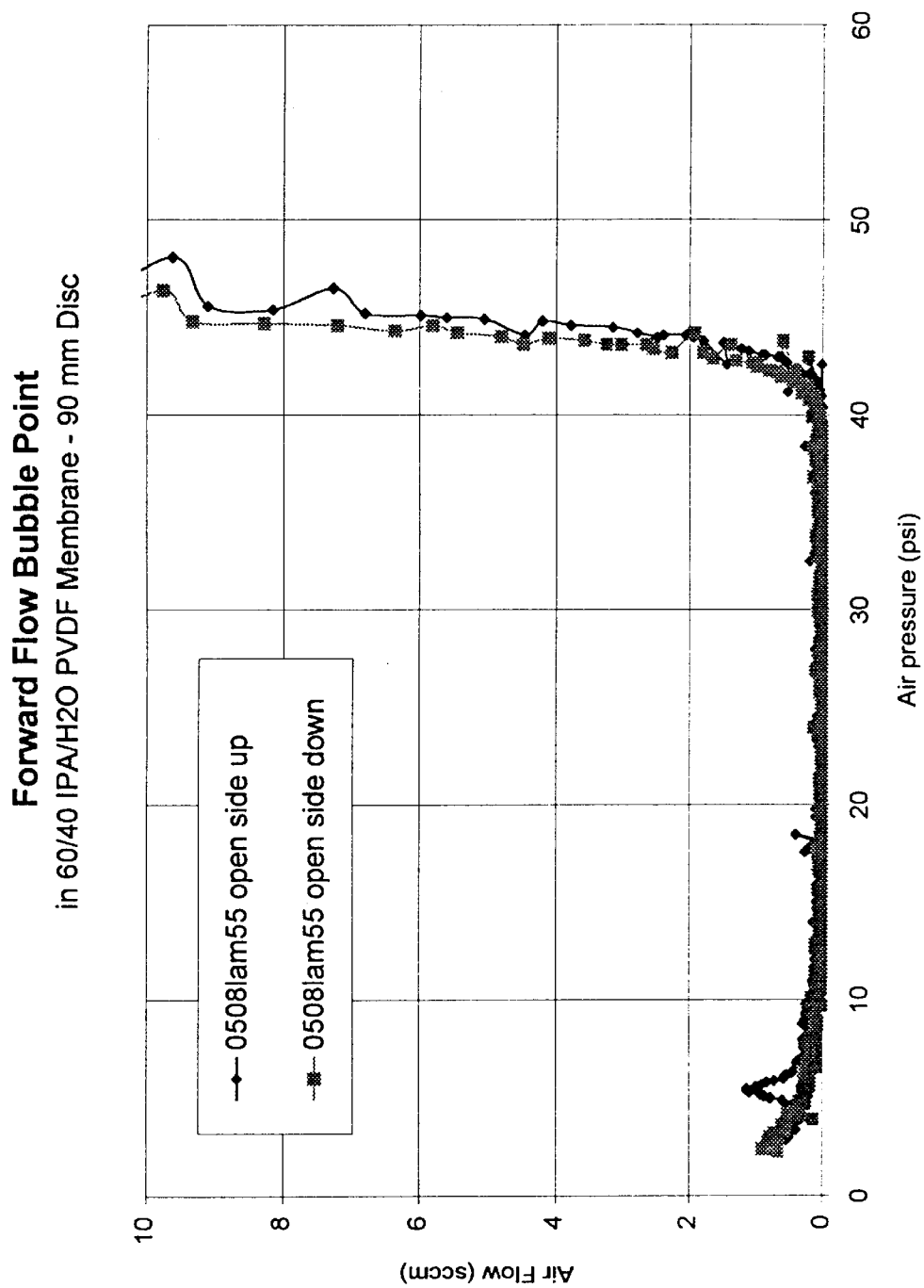
FIG. 8 illustrates a forward flow bubble point curve for a prior art laminated membrane.

FIG. 8 illustrates a forward flow bubble point curve for a prior art laminated membrane. Like the unsupported multizone membrane of the present disclosure, this forward flow bubble point curve also exhibits the peak at 5 psi when the upper zone pore clears. Thus, it is clear from FIGS. 7 and 8 that the presence of a peak clearly indicates that a multizone membrane is present and that the membrane of FIG. 7, when produced, was actually a multizone membrane as compared to the control of the two separately formed pore size membranes laminated together of the prior art.

Figure 9:
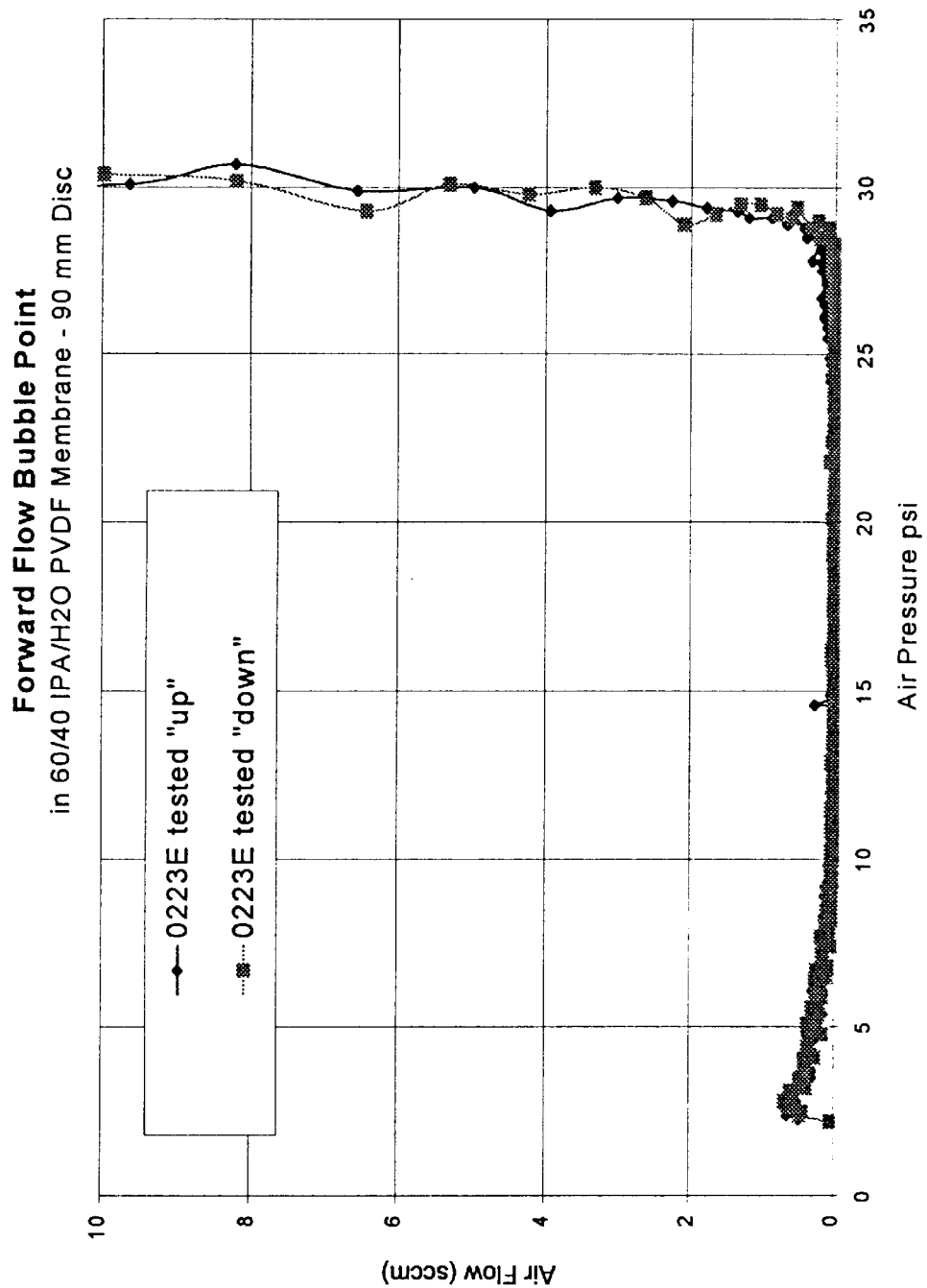
FIG. 9 illustrates a single zone forward flow bubble point curve.

FIG. 9 illustrates a single zone membrane forward flow bubble point curve. Note that the peak at 5 psi is missing regardless of sample orientation of the membrane in the test stand. There is no difference between the curves. Thus, it should be clear that there is no peak discernable from the forward flow bubble point for a single zone membrane. Therefore, the appearance of a peak in the forward flow bubble point graphs, as illustrated in FIG. 7, clearly indicates that the membrane tested was, in fact, a multizone membrane.

Figure 10:
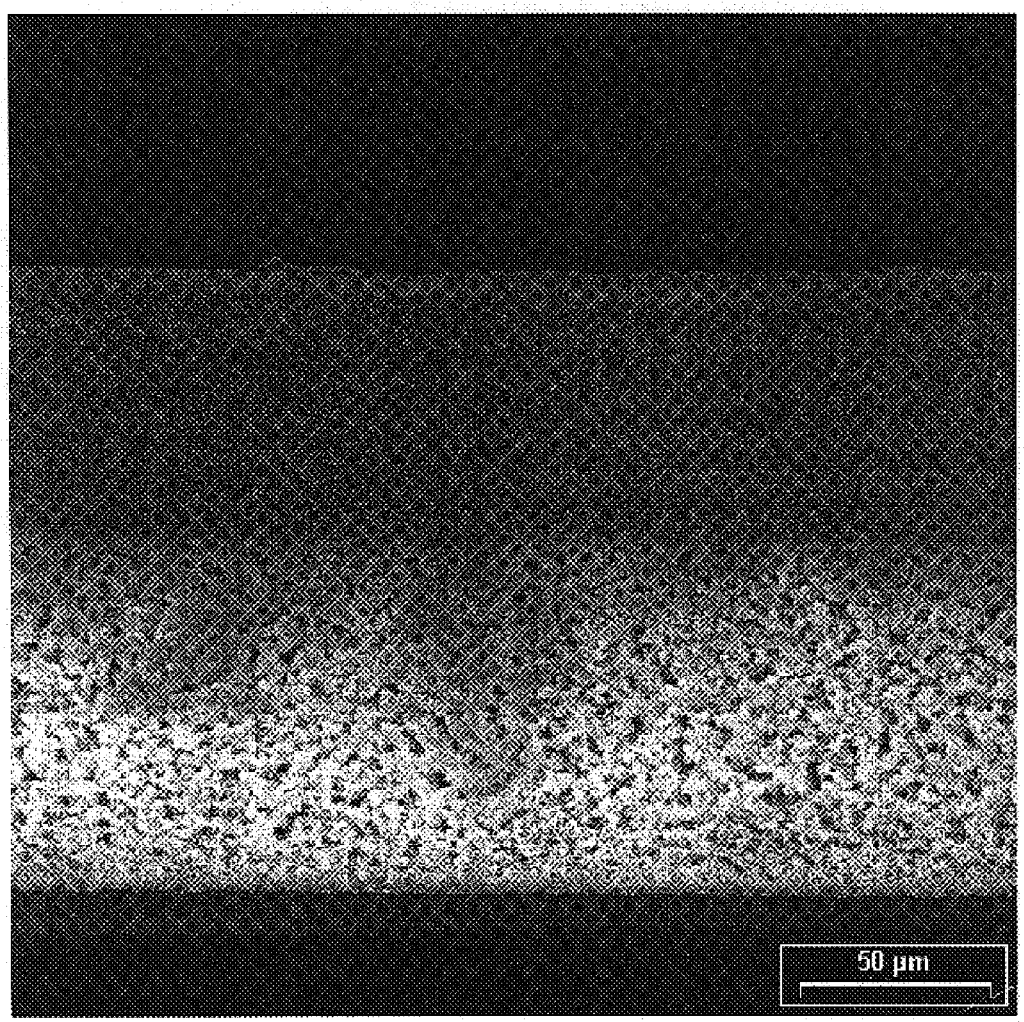
FIG. 10 illustrates a cross section of a prior art laminated PVDF membrane.
Figure 11:
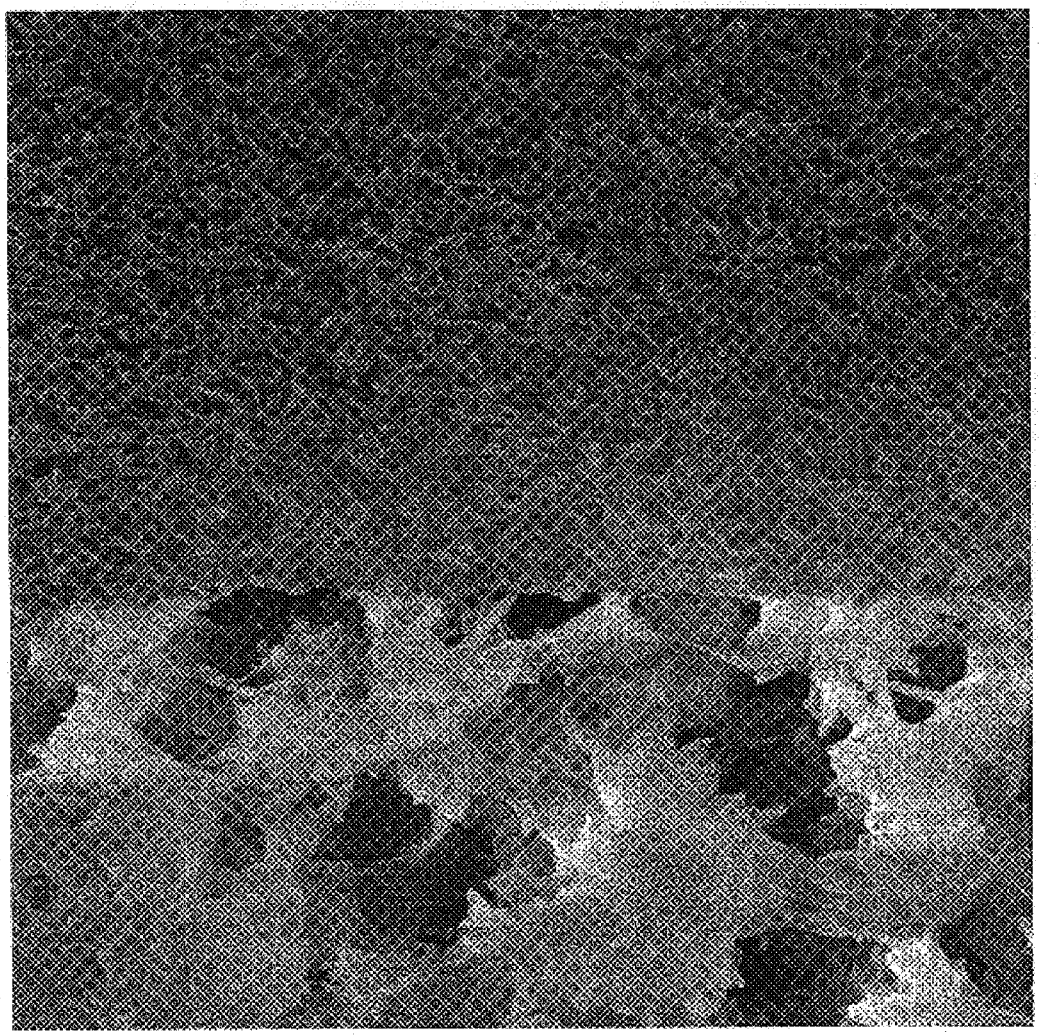
FIG. 11 illustrates a SEM close-up of the interface of the prior art laminated PVDF membrane of FIG. 10.

FIG. 10 illustrates a cross section of the laminated PVDF membrane. In the close up of the same membrane shown in FIG. 11, it is clearly ascertainable that the laminate does not form a continuous interface between the two zones, but each zone is simply pressed into place relative to the other zone. This type of bond between the zones is not as inherently strong as the continuous two zone membrane shown in FIG. 6.

The above example clearly demonstrates that multizone unsupported microporous membrane has been produced using polyvinylidene fluoride (PVDF) according to the concepts presented in the present disclosure.

Nylon Experiments

The following experiments were conducted to confirm the viability of the producing multizone, unsupported microporous membrane using Nylon.

Nylon Ingredients

The following ingredients were employed in the experiments that follow.

| Chemical | Trade name | Manufacturer | Mfg. Location |
|---|---|---|---|
| PET film | CI-100 500 gauge | FilmQuest | St. Charles, IL |
| Nylon 6,6 | Nylon 66Z or 66B | Solutia | St. Louis MO |
| Formic Acid | Formic Acid | BP Amoco | Cleveland, OH |
| Methanol | Methanol | Borden & Remington Chemical Co. | Fall River, MA |

Nylon Methods

Preparation of the Dopes

Two nylon dopes were prepared using the methods described in U.S. Pat. No. , 4,707,265, Example 1. The dopes were produced using about 16.0 percent by weight Nylon 66 (Solutia Vydyne® 66Z) polymer.

Process Description

Geometrically symmetric and pore size symmetric unsupported two and three zone membranes, each with their own pore structure was prepared as follows.

As illustrated in FIG. 15, a Polyester film suitable for use in the preparation of the present innovative unsupported multizone membrane (commercially available from FilmQuest St. Charles, Ill. as part number CI-100 500 gauge), was conveyed past both a single slot (slot C) and a multiple slot die (slots A and B), with all slots (A, B and C) of the slot dies being located on the same side of the PET film at speeds of about 20 ft/min.

When three layers of dope were coated on the PET film, the dope from the first slot, (slot C), was applied at a weight of about fifteen (15) gm/sq. meter of nylon solids. The dope from the other two slots (slots A and B) was coated at a weight of about twenty (20) gm/sq. meter of nylon solids.

If only two of the slots of the two slot dies were used, the dope from both slots was coated at about twenty (20) gm/sq. meter of nylon solids regardless of which of the two dies was used. The nylon solids were provided from the dissolved nylon in the dope solution, which was, for this example, sixteen (16.0) wt. % nylon solution.

Almost immediately following the application of the first dope layer, when a dope was cast using the first die, one or two other layers were cast from the double slot die on top of the first coated layer, first with a dope that produced a different pore size and then with a second dope that produced a different pore size of the two dopes or when all three slots were used, the three dopes, as shown in Table 2 below. The distance between the slots A and B in the multislot die was about 15–20 mils. The distance between the slot of the first die and the second slot of the multislot die was about 9.5 inches.

In one representative example, the coating weight of the dope delivered from each slot of the multislot slot die was about twenty (20) gm/sq. meter of Nylon solids in about a sixteen (16.0) wt % solution. The thus coated three dope multilayer structure was then quickly brought into contact with a Marinacco-style quench solution, which simultaneously quenched the multilayer structure from the outer surface of the multilayer structure furthest from the PET film, such that a multizone, continuous microporous membrane structure was formed.

In both the production of a two zone membrane or a three zone membrane, the quenched membrane was then washed, hand peeled from the PET film just after it was rinsed, mounted and restrained on a hemidrum and then dried. Removing membrane from the film prior to drying was found to be advantageous.

The test results are shown in Table 2 below.

TABLE 2

Results of Nylon Trials

| Sample | BP response | PET Film slot C BP in 60/40 IPA/Water psi | Middle slot B | Quench slot A | Zones |
|---|---|---|---|---|---|
| 0103 | predicted | 15 | 22 | 35 | |
| 0103 | actual | 12 | 23 | 29 | 3 |
| 0103 | difference | 3 | −1 | 6 | |
| 0107 | predicted | | 15 | 35 | |
| 0107 | actual | | 15 | 30 | 2 |
| 0107 | difference | | 0 | 5 | |
| 0110 | predicted | | 15 | 22 | |
| 0110 | actual | | 15 | 19 | 2 |
| 0110 | difference | | 0 | 3 | |
| 0111 | predicted | 15 | 22 | | |
| 0111 | actual | 15 | 19 | | 2 |
| 0111 | difference | 0 | 3 | | |
| 0206 | predicted | 15 | 22 | | |
| 0206 | actual | 15 | 21 | | 2 |
| 0206 | difference | 0 | 1 | | |
| 0207 | predicted | 15 | 22 | 35 | |
| 0207 | actual | 18 | 18 | 24 | 2 |
| 0207 | difference | −3 | 4 | 11 | |
| 0209 | predicted | | 22 | 15 | |
| 0209 | actual | | 20 | 16 | 2 |
| 0209 | difference | | 2 | −1 | |

Table 2 illustrates attribute testing of the unsupported multizone nylon membrane produced as described above. Most samples were run as two zone membrane and provided a two zone microporous membrane structure as evidenced by the forward flow bubble point curves, which show higher diffusion rates when the upper zone of pores have cleared, and SEM photographs. The unsupported multizone structure was evident whether the dies were run in sequence or simultaneously. The samples identified above as 103 was run as a three zone membrane.

Figure 12:
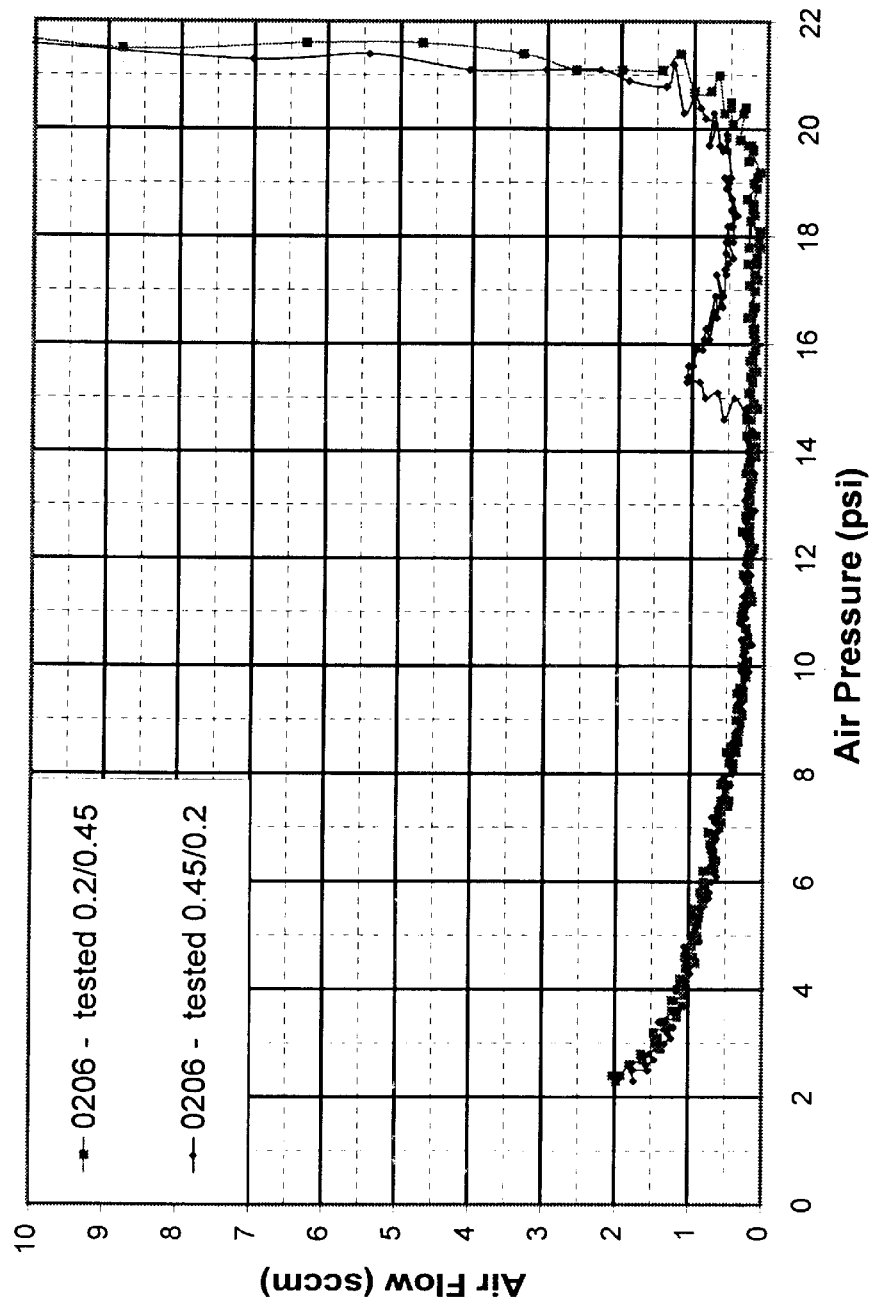
FIG. 12 illustrates a forward flow bubble point curve for nylon membrane sample 206 of table 2.

FIG. 12 show forward flow bubble point curves for nylon membrane wherein pressure is ramped continuously on a membrane wetted with about 60% IPA and about 40% water and the flow was monitored with a mass flow meter. As is known, flow is a measurement of either diffusion through the wetted membrane or bulk flow through the cleared pores or a combination.

When a membrane consisting of a single zone was tested, the response curve was independent of orientation, as illustrated above for the PVDF membrane. However, when an unsupported, multizone membrane of the present disclosure was tested, the response curve differed, depending on whether the larger pore size zone was upstream or downstream relative to the smaller pore size zone. If the larger pore size zone was upstream, when the pressure necessary to clear those pores was reached (the bubble point), the larger pore size zone suddenly cleared. At this point, the liquid will progress down until the smaller pore size zone just beneath the larger pore size zone is reached. However, once the pores of the larger pore size zone has cleared, the diffusion response also increased because the air no longer must diffuse through the entire depth of the membrane, but only through half of the membrane, the smaller pore zone.

On a forward flow bubble point (FFBP) curve, this transition causes an increase in the mass flow response. If a membrane, was tested with the relatively smaller pore size zone toward the air interface, then the pores will not clear until the relatively smaller pores have reached their bubble point, at which time the entire membrane clears. Since the membrane remained fully wetted during the entire test, the diffusion does not increase during the latter part of the test.

This difference is best illustrated in FIG. 12 wherein two curves are displayed for the same membrane sample. As shown, when tested with the relatively larger pore size zone upstream, the mass flow rose above the baseline at the bubble point of the relatively larger pore size upstream zone but did not experience bulk flow until the relatively smaller pore size pores were cleared as well.

Figure 13:
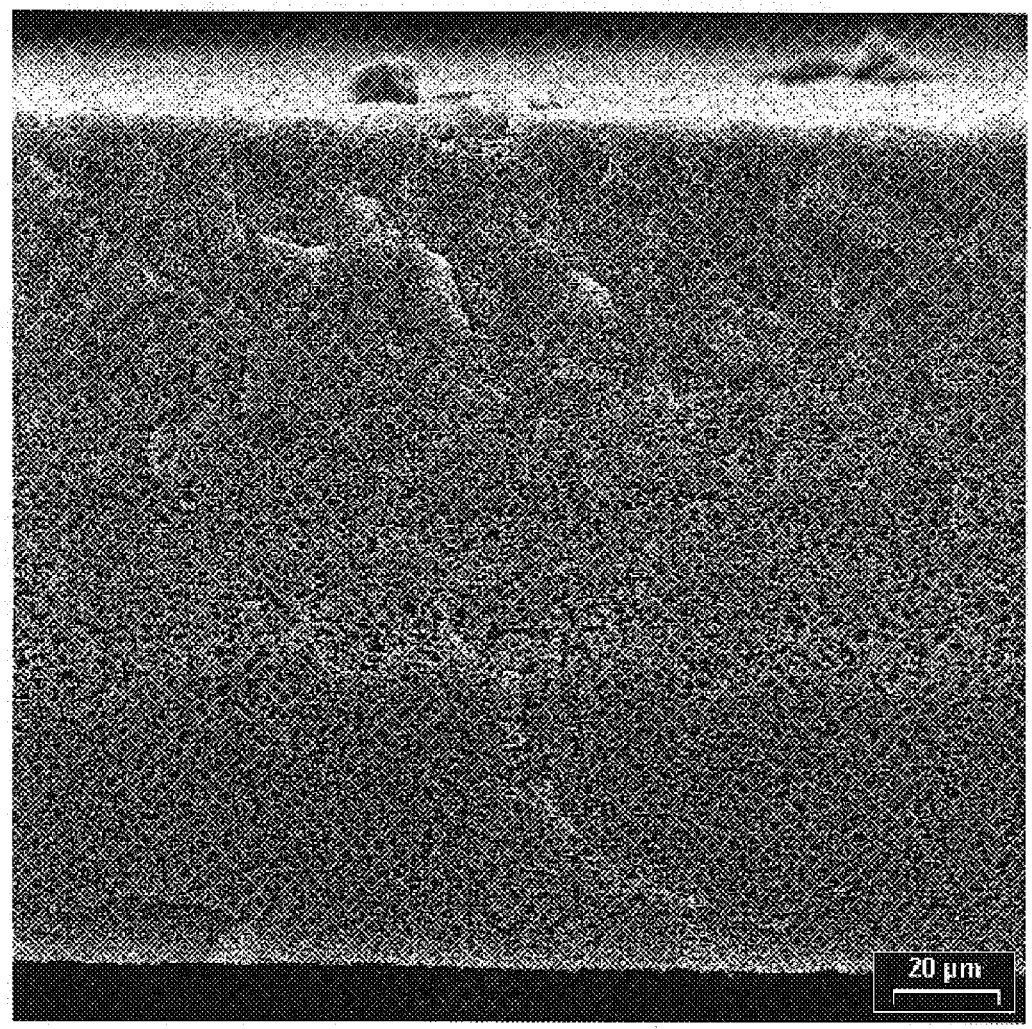
FIG. 13 illustrates a SEM cross section of membrane sample 0103 of table 2.
Figure 14:
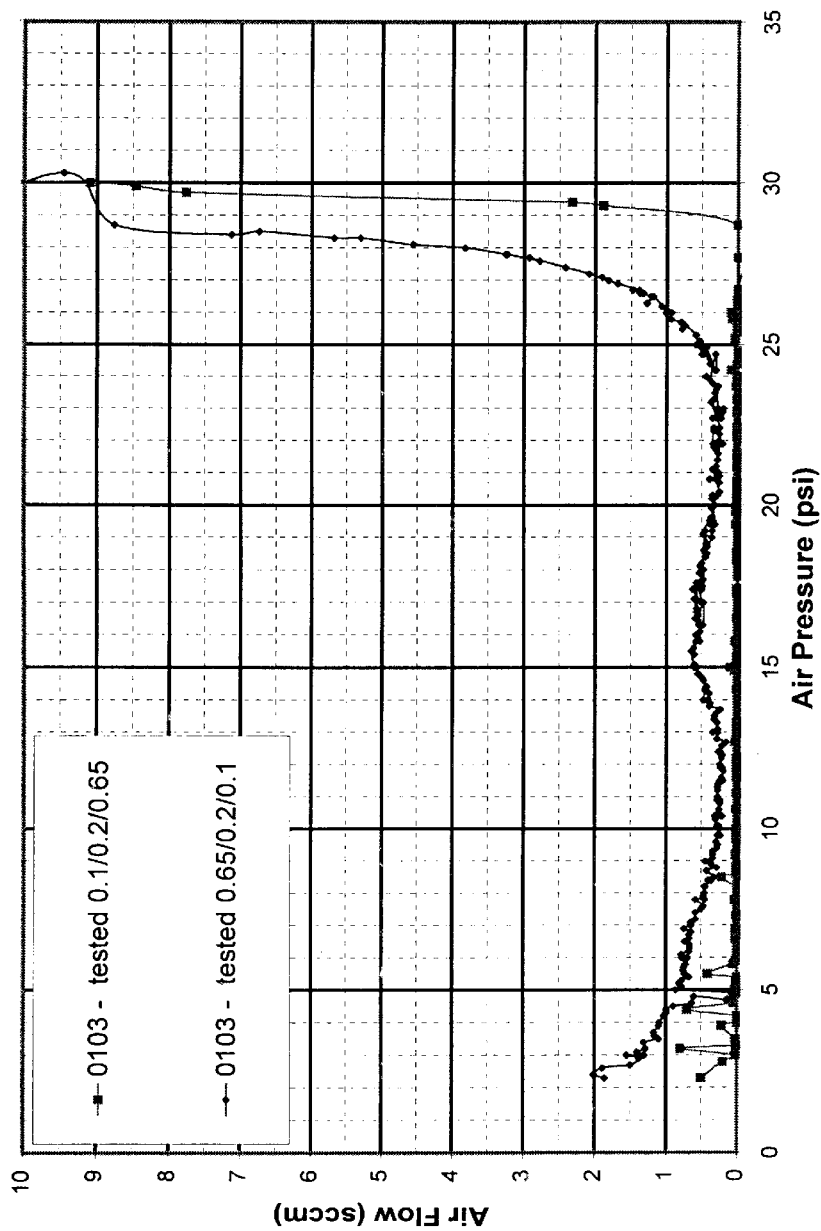
FIG. 14 illustrates a forward flow bubble point curve for nylon membrane sample 0103 of table 2.

Membrane sample 103 was a three zone membrane. As can be determined from both the SEM photograph of FIG. 13 and the forward flow bubble point curve of FIG. 14, three distinct membrane zones can be ascertained. The first zone was measured at about 13 psi from the curve generated with the open or relatively large pore zone upstream. This measurement can be seen as a significant rise above the baseline curve, which is generated with the tight or relatively small pore zone upstream. The second zone cleared at a pressure of about 24 psi, where the curve once again rises above the baseline. The third zone is not apparent in the curve where the open or relatively large pore zone side was placed upstream in the test. However, the third zone is apparent at 29 psi in the baseline curve when that same piece of membrane was flipped over and tested.

FIG. 15 schematically illustrates one possible representative apparatus that could be used with one possible representative method to produce the innovative multizone, unsupported membrane of the present disclosure.

As shown, the apparatus, similar to that disclosed in U.S. Pat. No. 6,090,441 to Vining et al., the disclosure of which has been previously been incorporated by reference herein, includes a casting or coating surface, PET film, used as the base upon which the dopes are deposited by a series of slot dies, a single die and then a multiple die, it being understood that other die or dope applying apparatus arrangements could be used, as well as different coating surface orientations, as long as the innovative unsupported, multizone membrane is successfully produced.

Thus, it is clear from the above that the present disclosure discloses innovative apparatus, methods and membrane that solve the prior art difficulties with the production of unsupported, multizone microporous membrane.

While the articles, apparatus and methods for making the articles contained herein constitute preferred embodiments of the disclosure, it is to be understood that the disclosure is not limited to these precise articles, apparatus and methods, and that changes may be made therein without departing from the scope of the disclosure which is defined in the appended

What is claimed is:

1. A process for forming a continuous, unsupported, multizone phase inversion microporous membrane having at least two zones, comprising of the acts of:
   operatively positioning at least one dope applying apparatus having at least two polymer dope feed slots relative to a continuously moving coating surface;
   cooperatively applying polymer dopes from each of the dope feed slots onto the continuously moving coating surface so as to create a multiple layer polymer dope coating on the coating surface;
   subjecting the multiple dope layer coating to contact with a phase inversion producing environment so as to form a wet multizone phase inversion microporous membrane; and separating the wet multizone phase inversion microporous membrane from the continuously moving coating surface at some point prior to complete drying of the membrane.

2. The process of claim 1 wherein the polymer dope comprises:
   nylon.

3. The process of claim 1 wherein the polymer dope comprises:
   polyvinylidene fluoride.

4. The process of claim 3 wherein the separating act is accomplished prior to completion of drying the wet multizone phase inversion microporous membrane.

5. The process of claim 4 wherein the separating act is accomplished after phase inversion.

6. The process of claim 4 wherein the separating act is accomplished during washing.

7. The process of claim 1 wherein the polymer dope comprises:
   polyether sulfone.

8. The process of claim 7 wherein the separating act is accomplished prior to complete formation of a multizone phase inversion microporous membrane.

9. The process of claim 7 wherein the separating act is accomplished during washing of the wet multizone phase inversion microporous membrane.

10. The process of claim 7 wherein the separating act is accomplished prior to complete formation of a multizone phase in version microporous membrane.

11. The process of claim 7 wherein the separating act is accomplished during washing of the wet multizone phase inversion microporous membrane.

12. The process of claim 1 further comprising the acts of: washing and drying the membrane.

13. The process of claim 1 wherein the multizone membrane has a type II configuration.

14. The process of claim 1 wherein the multizone membrane has a type III configuration.

15. The process of claim 1 wherein the multizone membrane has a type IV configuration.

16. The process of claim 1 wherein the multizone membrane has a type V configuration.

17. The process of claim 1 wherein the multizone membrane has a type VI configuration.

18. The process of claim 1 wherein the multizone membrane has a type VII configuration.

19. The process of claim 1 wherein the multizone membrane has a type VIII configuration.

20. The process of claim 1 wherein the multizone membrane has a type IX configuration.

21. The process of claim 1 wherein the multizone membrane has a type I configuration.

22. The process of claim 1 wherein the separating act is accomplished before drying the wet multizone phase inversion microporous membrane.

23. A process for forming a continuous, unsupported, multizone phase inversion microporous membrane having at least two zones, comprising of the acts of:
   operatively positioning at least two dope applying apparatus, each having at least one polymer dope feed slot, relative to a coating surface;
   applying polymer dope from each of the dope applying apparatus onto the coating surface so as to create a multiple layer polymer dope coating on the coating surface;
   subjecting the multiple layer polymer dope coating on the coating surface to contact with a phase inversion producing environment so as to form a wet multizone phase inversion microporous membrane; and
   separating the wet multizone phase inversion microporous membrane from the continuously moving coating surface at some point prior to complete drying of the membrane.

24. The process of claim 23 wherein the polymer dope comprises:
   nylon.

25. The process of claim 23 wherein the polymer dope comprises:
   polyvinylidene fluoride.

26. The process of claim 25 wherein the separating act is accomplished prior to completion of drying the wet multizone phase inversion microporous membrane.

27. The process of claim 23 wherein the polymer dope comprises:
   polyether sulfone.

28. The process of claim 27 wherein the separating act is accomplished prior to complete formation of a multizone phase inversion microporous membrane.

29. The process of claim 28 wherein the separating act is accomplished during washing of the wet multizone phase inversion microporous membrane.

30. The process of claim 23 further comprising the acts of: washing and drying the membrane.

31. The process of claim 23 wherein the multizone membrane has a type I configuration.

32. The process of claim 23 wherein the multizone membrane has a type II configuration.

33. The process of claim 23 wherein the multizone membrane has a type III configuration.

34. The process of claim 23 wherein the multizone membrane has a type IV configuration.

35. The process of claim 23 wherein the multizone membrane has a type V configuration.

36. The process of claim 23 wherein the multizone membrane has a type VI configuration.

37. The process of claim 23 wherein the multizone membrane has a type VII configuration.

38. The process of claim 23 wherein the multizone membrane has a type VIII configuration.

39. The process of claim 23 wherein the multizone membrane has a type IX configuration.

40. The process of claim 23 wherein the separating act is accomplished before drying the wet multizone phase inversion microporous membrane.

41. A continuous, unsupported, multizone phase inversion microporous membrane having at least two zones prepared by a process comprising of the acts of:
   operatively positioning at least one dope applying apparatus having at least two polymer dope feed slots relative to a continuously moving coating surface;

cooperatively applying polymer dopes from each of the dope feed slots onto the continuously moving coating surface so as to create a multiple layer polymer dope coating on the coating surfaces;

subjecting the multiple dope layer coating to contact with a phase inversion producing environment so as to form a wet multizone phase inversion microporous membrane; and separating the wet multizone phase inversion microporous membrane from the continuously moving coating surface.

42. The continuous, unsupported, multizone phase inversion microporous membrane of claim 41 wherein the polymer dope comprises:

nylon.

43. The continuous, unsupported, multizone phase inversion microporous membrane of claim 41 wherein the polymer dope comprises:

polyvinylidene fluoride.

44. The continuous, unsupported, multizone phase inversion microporous membrane of claim 41 wherein the polymer dope comprises:

polyether sulfone.

45. The continuous, unsupported, multizone phase inversion microporous membrane of claim 41 wherein the process further comprises the acts of:

washing and drying the membrane.

46. The continuous, unsupported, multizone phase inversion microporous membrane of claim 41 wherein the multizone membrane has a type II configuration.

47. The continuous, unsupported, multizone phase inversion microporous membrane of claim 41 wherein the multizone membrane has a type III configuration.

48. The continuous, unsupported, multizone phase inversion microporous membrane of claim 41 wherein the multizone membrane has a type IV configuration.

49. The continuous, unsupported, multizone phase inversion microporous membrane of claim 41 wherein the multizone membrane has a type V configuration.

50. The continuous, unsupported, multizone phase inversion microporous membrane of claim 41 wherein the multizone membrane has a type VI configuration.

51. The continuous, unsupported, multizone phase inversion microporous membrane of claim 41 wherein the multizone membrane has a type VII configuration.

52. The continuous, unsupported, multizone phase inversion microporous membrane of claim 41 wherein the multizone membrane has a type VIII configuration.

53. The continuous, unsupported, multizone phase inversion microporous membrane of claim 41 wherein the multizone membrane has a type IX configuration.

54. The continuous, unsupported, multizone phase inversion microporous membrane of claim 41 wherein the multizone membrane has a type I configuration.

55. A continuous, unsupported, multizone phase inversion microporous membrane having at least two zones prepared by a process comprising of the acts of:

operatively positioning at least two dope applying apparatus, each having at least one polymer dope feed slot, relative to a coating surface;

applying polymer dope from each of the dope applying apparatus onto the coating surface so as to create a multiple layer polymer dope coating on the coating surface;

subjecting the multiple layer polymer dope coating on the coating surface to contact with a phase inversion producing environment so as to form a wet multizone phase inversion microporous membrane; and separating the wet multizone phase inversion microporous membrane from the continuously moving coating surface.

56. The continuous, unsupported, multizone phase inversion microporous membrane of claim 55 wherein the polymer dope comprises:

nylon.

57. The continuous, unsupported, multizone phase inversion microporous membrane of claim 55 wherein the polymer comprises:

polyvinylidene fluoride.

58. The continuous, unsupported, multizone phase inversion microporous membrane of claim 55 wherein the polymer dope comprises:

polyether sulfone.

59. The continuous, unsupported, multizone phase inversion microporous membrane of claim 58 wherein the separating act is accomplished prior to complete formation of a multizone phase inversion microporous membrane.

60. The continuous, unsupported, multizone phase inversion microporous membrane of claim 59 wherein the separating act is accomplished during washing of the wet multizone phase inversion microporous membrane.

61. The continuous, unsupported, multizone phase inversion microporous membrane of claim 55 wherein the process further comprises the acts of:

washing and drying the membrane.

62. The continuous, unsupported, multizone phase inversion microporous membrane of claim 55 wherein the multizone membrane has a type I configuration.

63. The continuous, unsupported, multizone phase inversion microporous membrane of claim 55 wherein the multizone membrane has a type II configuration.

64. The continuous, unsupported, multizone phase inversion microporous membrane of claim 55 wherein the multizone membrane has a type III configuration.

65. The continuous, unsupported, multizone phase inversion microporous membrane of claim 55 wherein the multizone membrane has a type IV configuration.

66. The continuous, unsupported, multizone phase inversion microporous membrane of claim 55 wherein the multizone membrane has a type V configuration.

67. The continuous, unsupported, multizone phase inversion microporous membrane of claim 55 wherein the multizone membrane has a type VI configuration.

68. The continuous, unsupported, multizone phase inversion microporous membrane of claim 55 wherein the multizone membrane has a type VII configuration.

69. The continuous, unsupported, multizone phase inversion microporous membrane of claim 55 wherein the multizone membrane has a type VIII configuration.

70. The continuous, unsupported, multizone phase inversion microporous membrane of claim 55 wherein the multizone membrane has a type IX configuration.

71. The continuous, unsupported, multizone phase inversion microporous membrane of claim 55 wherein the separating act is accomplished before drying the wet multizone phase inversion microporous membrane.

72. The continuous, unsupported, multizone phase inversion microporous membrane of claim 71 wherein the separating act is accomplished after phase inversion.

73. The continuous, unsupported, multizone phase inversion microporous membrane of claim 71 wherein the separating act is accomplished during washing.

74. The continuous, unsupported, multizone phase inversion microporous membrane of claim 72 wherein the separating act is accomplished prior to completion of drying the wet multizone phase inversion microporous membrane.

75. The continuous, unsupported, multizone phase inversion microporous membrane of claim 71 wherein the separating act is accomplished prior to completion of drying the wet multizone phase inversion microporous membrane.

* * * * *

Adverse Decision in Interference

Patent No. 6,706,184, Richard Sale and Eugene Ostreicher, UNSUPPORTED MULTIZONE MICROPOROUS MEMBRANE, Interference No. 105,726, final judgment adverse to the patentees rendered February 19, 2010, as to claims 1-40.

(*Official Gazette, April 27, 2010*)